US009590984B2

(12) United States Patent
Cronin (10) Patent No.: US 9,590,984 B2
(45) Date of Patent: Mar. 7, 2017

(54) SMARTPHONE FINGERPRINT PASS-THROUGH SYSTEM (71) Applicant: GrandiOs Technologies, LLC, Wilmington, DE (US)

(72) Inventor: John Cronin, Bonita Springs, FL (US)

(73) Assignee: GRANDIOS TECHNOLOGIES, LLC, Charleston, SC (US)

(*) Notice: Subject to any disclaimer, the term of this patent is extended or adjusted under 35 U.S.C. 154(b) by 0 days.

(21) Appl. No.: 14/622,803

(22) Filed: Feb. 13, 2015

(65) Prior Publication Data

US 2015/0358315 A1 Dec. 10, 2015

Related U.S. Application Data (60) Provisional application No. 62/007,824, filed on Jun. 4, 2014.

(51) Int. Cl.
H04L 29/06 (2006.01)
H04W 12/06 (2009.01)
H04W 88/02 (2009.01)
H04M 1/67 (2006.01)
H04M 1/725 (2006.01)

(52) U.S. Cl.
CPC ......... *H04L 63/0861* (2013.01); *H04W 12/06* (2013.01); *H04L 63/0853* (2013.01); *H04M 1/67* (2013.01); *H04M 1/72533* (2013.01); *H04W 88/02* (2013.01)

(58) Field of Classification Search
CPC .................................................. H04L 63/0861
USPC ....................................................... 713/186
See application file for complete search history.

(56) References Cited

U.S. PATENT DOCUMENTS

| 6,104,922 | A | 8/2000 | Baumann |
|---|---|---|---|
| 6,697,947 | B1 | 2/2004 | Matyas, Jr. et al. |
| 6,928,546 | B1 | 8/2005 | Nanavati et al. |
| 7,000,116 | B2 | 2/2006 | Bates et al. |
| 7,433,685 | B2 | 10/2008 | Ritter |
| 7,835,721 | B2 | 11/2010 | Tuulos et al. |
| 7,877,594 | B1 | 1/2011 | DiSanto et al. |
| 8,086,867 | B2 | 12/2011 | Freeman et al. |
| 8,312,064 | B1 | 11/2012 | Gauvin |

(Continued)

FOREIGN PATENT DOCUMENTS

| WO | WO 01/97432 | 12/2001 |
|---|---|---|
| WO | WO 03/047160 | 6/2003 |

(Continued)

OTHER PUBLICATIONS

Filip Truta, "Start Your Car Remotely with Viper SmartStart for iPhone", Oct. 14, 2009.*

(Continued)

*Primary Examiner* — John B King
(74) *Attorney, Agent, or Firm* — Polsinelli LLP (57) ABSTRACT Systems and methods are provided for unlocking remote devices using a biometric input that is associated with a code stored on a mobile electronic device. After validating a biometric input that corresponds with a code that locks or unlocks a remote lock, the code may be sent to a remote electronic device in a transmission. When the code is validated by the remote electronic device as being associated with unlocking the remote lock, the remote device may then unlock the lock.

20 Claims, 5 Drawing Sheets

(56) References Cited

U.S. PATENT DOCUMENTS

| | | |
|---|---|---|
| 8,464,320 B2 | 6/2013 | Archer et al. |
| 8,467,770 B1 | 6/2013 | Ben Ayed |
| 8,577,042 B2 | 11/2013 | Worthy |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,646,060 B1 | 2/2014 | Ben Ayed |
| 8,660,501 B2 | 2/2014 | Sanguinetti |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,838,071 B1 | 9/2014 | Cronin |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 8,973,110 B2 | 3/2015 | Mizoguchi et al. |
| 9,288,207 B2 | 3/2016 | Cronin |
| 9,361,439 B1 | 6/2016 | Bauchspies |
| 9,381,890 B2 * | 7/2016 | Lee ............... B60K 28/02 |
| 9,391,988 B2 | 7/2016 | Cronin |
| 2002/0116508 A1 | 8/2002 | Khan et al. |
| 2002/0138767 A1 | 9/2002 | Hamid et al. |
| 2003/0046083 A1* | 3/2003 | Devinney, Jr. ......... G06Q 20/00 704/273 |
| 2003/0074317 A1 | 4/2003 | Hofi |
| 2003/0135740 A1 | 7/2003 | Talmor et al. |
| 2004/0049675 A1* | 3/2004 | Micali et al. ............. 713/158 |
| 2004/0148526 A1 | 7/2004 | Sands et al. |
| 2005/0195076 A1 | 9/2005 | McCulloch et al. |
| 2005/0268107 A1 | 12/2005 | Harris et al. |
| 2005/0272445 A1 | 12/2005 | Zellner |
| 2005/0273444 A1 | 12/2005 | Delgrosso et al. |
| 2006/0053280 A1 | 3/2006 | Kittle et al. |
| 2007/0032225 A1 | 2/2007 | Konicek |
| 2007/0061272 A1 | 3/2007 | Delgrosso et al. |
| 2007/0192137 A1 | 8/2007 | Ombrellaro |
| 2007/0273471 A1 | 11/2007 | Shilling et al. |
| 2008/0086767 A1 | 4/2008 | Kulkarni et al. |
| 2008/0102790 A1 | 5/2008 | Schultz |
| 2008/0189776 A1 | 8/2008 | Constable |
| 2008/0209505 A1 | 8/2008 | Ghai et al. |
| 2008/0211627 A1 | 9/2008 | Shinzaki |
| 2008/0261560 A1 | 10/2008 | Rukart |
| 2008/0305766 A1 | 12/2008 | Falk |
| 2009/0126013 A1 | 5/2009 | Atwood et al. |
| 2009/0170532 A1 | 7/2009 | Lee et al. |
| 2009/0186633 A1 | 7/2009 | Yonker et al. |
| 2009/0190802 A1 | 7/2009 | Adams et al. |
| 2009/0265544 A1 | 10/2009 | Moona et al. |
| 2010/0005293 A1 | 1/2010 | Errico |
| 2010/0240415 A1 | 9/2010 | Kim et al. |
| 2010/0253470 A1 | 10/2010 | Burke |
| 2011/0107427 A1 | 5/2011 | Cohen et al. |
| 2011/0215597 A1* | 9/2011 | Weum ..................... 292/144 |
| 2011/0225623 A1 | 9/2011 | Wright |
| 2011/0239270 A1 | 9/2011 | Sovio et al. |
| 2011/0252464 A1 | 10/2011 | Sanjeev |
| 2011/0256904 A1* | 10/2011 | Simmons ............... B60R 25/00 455/556.1 |
| 2011/0264919 A1 | 10/2011 | Pizano et al. |
| 2012/0017264 A1 | 1/2012 | Hanna |
| 2012/0072996 A1 | 3/2012 | Svendsen et al. |
| 2012/0121140 A1 | 5/2012 | Gerken |
| 2012/0144464 A1 | 6/2012 | Fakhrai |
| 2012/0268241 A1 | 10/2012 | Hanna et al. |
| 2012/0297464 A1 | 11/2012 | Busch et al. |
| 2013/0054695 A1 | 2/2013 | Holman et al. |
| 2013/0099892 A1* | 4/2013 | Tucker ............... G07C 9/00309 340/5.61 |
| 2013/0103951 A1 | 4/2013 | Klevan et al. |
| 2013/0117833 A1 | 5/2013 | Ochi |
| 2013/0167207 A1 | 6/2013 | Davis et al. |
| 2013/0247156 A1 | 9/2013 | Savo |
| 2013/0269013 A1 | 10/2013 | Parry et al. |
| 2013/0303192 A1 | 11/2013 | Louboutin |
| 2013/0317835 A1 | 11/2013 | Mathew |
| 2013/0318580 A1 | 11/2013 | Gudlavenkatasiva et al. |
| 2013/0328917 A1 | 12/2013 | Zambetti et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2014/0002388 A1 | 1/2014 | Han et al. |
| 2014/0003683 A1 | 1/2014 | Vieta et al. |
| 2014/0004828 A1 | 1/2014 | Han et al. |
| 2014/0006795 A1 | 1/2014 | Han et al. |
| 2014/0007185 A1 | 1/2014 | Han et al. |
| 2014/0007223 A1 | 1/2014 | Han et al. |
| 2014/0007225 A1 | 1/2014 | Gay et al. |
| 2014/0062773 A1 | 3/2014 | MacGougan |
| 2014/0065962 A1 | 3/2014 | Le |
| 2014/0071221 A1 | 3/2014 | Dave |
| 2014/0105084 A1 | 4/2014 | Chhabra |
| 2014/0106711 A1 | 4/2014 | Seo et al. |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167709 A1 | 6/2014 | Nath |
| 2014/0168170 A1 | 6/2014 | Lazarescu |
| 2014/0171114 A1 | 6/2014 | Marti |
| 2014/0180820 A1 | 6/2014 | Louboutin |
| 2014/0187200 A1 | 7/2014 | Reitter et al. |
| 2014/0191979 A1 | 7/2014 | Tsudik |
| 2014/0196106 A1 | 7/2014 | Zellner |
| 2014/0200053 A1 | 7/2014 | Balasubramanian |
| 2014/0222335 A1 | 8/2014 | Piemonte |
| 2014/0223283 A1 | 8/2014 | Hancock et al. |
| 2014/0232633 A1 | 8/2014 | Shultz |
| 2014/0232634 A1 | 8/2014 | Piemonte |
| 2014/0247279 A1 | 9/2014 | Nicholas |
| 2014/0247280 A1 | 9/2014 | Nicholas |
| 2014/0269562 A1 | 9/2014 | Burchill |
| 2014/0270415 A1 | 9/2014 | Alameh et al. |
| 2014/0274150 A1 | 9/2014 | Marti |
| 2014/0283135 A1 | 9/2014 | Shepherd |
| 2014/0293959 A1 | 10/2014 | Singh |
| 2014/0310788 A1 | 10/2014 | Ricci |
| 2014/0364089 A1 | 12/2014 | Lienhart |
| 2014/0364148 A1 | 12/2014 | Block |
| 2014/0365120 A1 | 12/2014 | Vulcano |
| 2014/0379340 A1 | 12/2014 | Timem et al. |
| 2015/0011242 A1 | 1/2015 | Nagaraj |
| 2015/0026588 A1 | 1/2015 | Turcotte et al. |
| 2015/0026623 A1 | 1/2015 | Horne |
| 2015/0031397 A1 | 1/2015 | Jouaux |
| 2015/0040180 A1 | 2/2015 | Jacobson et al. |
| 2015/0045013 A1* | 2/2015 | Simmons ............... H04W 4/008 455/420 |
| 2015/0082396 A1 | 3/2015 | Theebaprakasam et al. |
| 2015/0224964 A1* | 8/2015 | Manotas, Jr. ......... F02N 11/0807 701/2 |
| 2015/0281279 A1 | 10/2015 | Smith et al. |
| 2015/0319169 A1 | 11/2015 | Cronin |
| 2015/0358316 A1 | 12/2015 | Cronin |
| 2015/0358333 A1 | 12/2015 | Cronin |

FOREIGN PATENT DOCUMENTS

| | | |
|---|---|---|
| WO | WO 2015/168703 | 11/2015 |
| WO | WO 2015/187452 | 12/2015 |

(56) References Cited

FOREIGN PATENT DOCUMENTS

| WO | WO 2015/187504 | 12/2015 |
|---|---|---|
| WO | WO 2015/187505 | 12/2015 |

OTHER PUBLICATIONS

U.S. Appl. No. 14/477,437, John Cronin, Secure Communications Smartphone System, filed Sep. 4, 2014.
U.S. Appl. No. 14/622,808, John Cronin, Community Biometric Authentication on a Smartphone, filed Feb. 13, 2015.
U.S. Appl. No. 14/622,806, John Cronin, Geo-Location and Biometric Presence Security, filed Feb. 13, 2015.
U.S. Appl. No. 14/622,808; Office Action mailed Apr. 22, 2015.
Busch, Christop; "Biometric Transaction Authentication Protocol (BTAP)" Fraunhofer IGD, Gjovik University College, Aug. 26, 2011.
Constantin, Lucian; "Fingerprint sensor in iPhone 5s is no silver bullet, researchers say", Computerworld, Sep. 20, 2013.
Falcon, Alvaris; "20 Gadgets That Make Your Smartphone even Smarter", hongkiat.com, 2012.
FingerQ. Copyright 2013-2014 FingerQ Macao Commercial Offshore Limited. Date of download Jul. 5, 2014. Http://www.fingerq.com/FQCA/fingerqchat.php?target=voicechat&lang=en.
"First Watch Security SRG717 SecuRemote Garage Access System", A fine WordPress.com site, Jun. 7, 2013.
Othoman, Asem; Ross, Arun; "Mixing fingerprints", SPIE, 2013.
Secure. Simple. Always Available., www.SenditCertifiedl.com, Video Reference best viewed at this link: https://www.youtube.com/watch?v=w2SO7DBzVsQ. Date of download Jul. 10, 2014.
Secure. Simple. Always Available., Proof of Delivery Log, www.SenditCertifiedl.com, Video Reference best viewed at this link: https://www.youtube.com/watch?v=mUKI2aXHdB4. Date of download Jul. 10, 2014.
"Wifi Garage Door Options" Postscapes, download date Dec. 17, 2013.
U.S. Appl. No. 14/477,437; Office Action mailed Jun. 17, 2015.
U.S. Appl. No. 14/622,806; Office Action mailed May 18, 2015.
PCT Application No. PCT/US2015/032883 International Search Report and Written Opinion mailed Aug. 21, 2015.
PCT Application No. PCT/US2015/033387 International Search Report and Written Opinion mailed Aug. 25, 2015.
PCT Application No. PCT/US2015/033389 International Search Report and Written Opinion mailed Sep. 2, 2015.
U.S. Appl. No. 14/622,808; Final Office Action mailed Sep. 30, 2015.
U.S. Appl. No. 14/622,806 Final Office Action mailed May 19, 2016.
PCT Application No. PCT/US2015/032998 International Search Report and Written Opinion mailed Nov. 4, 2015.
U.S. Appl. No. 14/622,806 Final Office Action mailed Dec. 21, 2015.
U.S. Appl. No. 15/070,676 Office Action mailed Oct. 3, 2016.
U.S. Appl. No. 14/622,806 Final Office Action mailed Dec. 23, 2016.

* cited by examiner

SMARTPHONE FINGERPRINT PASS-THROUGH SYSTEM

CROSS-REFERENCE TO RELATED APPLICATIONS

The present application claims the priority benefit of U.S. provisional application No. 62/007,824 filed Jun. 4, 2014 and entitled "Smartphone Fingerprint Pass-Through System", the disclosure of which is incorporated herein by reference.

BACKGROUND OF THE INVENTION

1. Field of the Invention

The present invention generally relates to the fields of mobile telephones and wireless security, and in particular, to utilizing a mobile device as a pass-through device to unlock other devices.

2. Description of the Related Art

Fingerprint recognition is a technology that is well known in the art. Fingerprint recognition is used by some mobile devices as a method of verifying a user's identity before unlocking the mobile device. Mobile devices also may be used as "pass-through" devices which may remotely unlock or activate another device operationally connected to the mobile device.

While "fingerprint" may be referenced herein, any form of biometric input may be used to validate the identity of a person. Examples may include an actual fingerprint, a retina scan, a DNA sample, or a voiceprint.

There is, however, currently no method by which a user may unlock another device by using the fingerprint recognition device on his mobile device.

SUMMARY OF THE PRESENTLY CLAIMED INVENTION

Embodiments of the present invention may include a system and method for unlocking remote devices using a biometric input that is associated with a code stored on a mobile electronic device. After validating a biometric input that corresponds with a code that locks or unlocks a remote lock, the code may be sent to a remote electronic device in a transmission. When the code is validated by the remote electronic device as being associated with unlocking the remote lock, the remote device may then unlock the lock.

Further embodiments may include methods for unlocking remote devices using a biometric input. Such methods may include securing an external electronic device using a biometric input in a mobile electronic device, receiving a biometric input by the mobile electronic device, validating that the biometric input belongs to an authorized user, and transmitting a security code from the mobile electronic device to the external electronic device. Such security code may correspond to the biometric input. The correspondence of the security code and biometric input may have been previously initialized by the authorized user, and as such, the security code may then unlock a lock associated with the external electronic device.

BRIEF DESCRIPTION OF THE DRAWINGS

FIG. 2 illustrates exemplary operating system settings that may be used in a system for smartphone fingerprint pass-through.

FIG. 3 illustrates an exemplary system for smartphone fingerprint pass-through.

FIG. 4 is a flowchart illustrating an exemplary method for smartphone fingerprint pass-through.

FIG. 5 illustrates a device architecture of a user device that may be used in a system for smartphone fingerprint pass-through.

DETAILED DESCRIPTION

Embodiments of the present invention may include a system and method for unlocking remote devices using a biometric input that is associated with a code stored on a mobile electronic device. After validating a biometric input that corresponds with a code that locks or unlocks a remote lock, the code may be sent to a remote electronic device in a transmission. When the code is validated by the remote electronic device as being associated with unlocking the remote lock, the remote device may then unlock the lock. While "fingerprint" may be referenced herein, any form of biometric input may be used to validate the identity of a person. As such, the teaching presented in association with fingerprints may further be associated with any type of biometric input known in the art, including actual fingerprints, retina scans, DNA sampling, and voiceprints.

Figure 1:
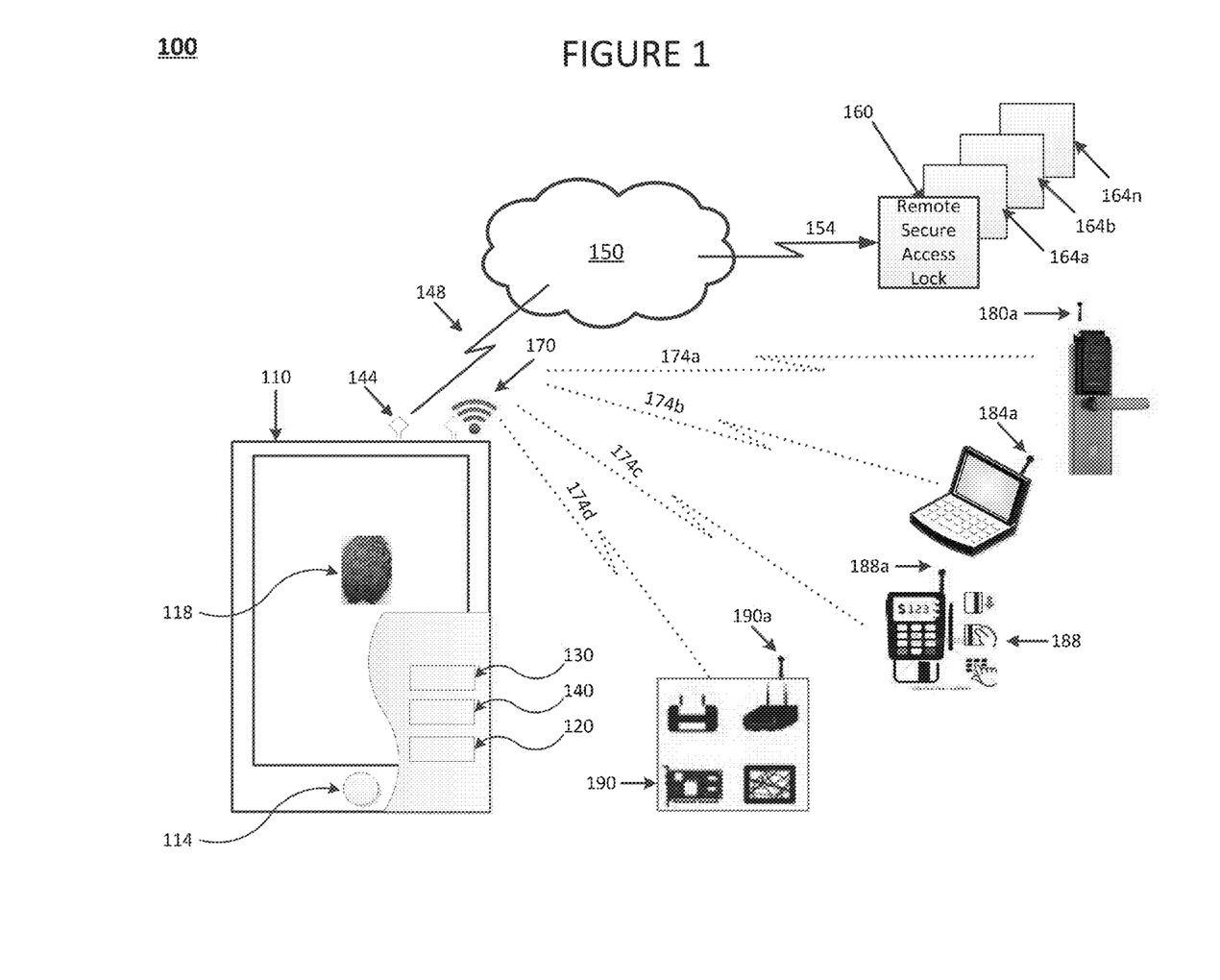
FIG. 1 illustrates an exemplary network environment in which a system for smartphone fingerprint pass-through may be implemented.

FIG. 1 illustrates an exemplary network environment 100 in which a system for smartphone fingerprint pass-through may be implemented. Network environment 100 may include smartphone 110 (which includes home button 114, fingerprint recognition module 118, applications 120, operating system 130, settings 140, antenna 144, and Bluetooth antenna 170), remote secure access lock 160, remotely connected devices 164a-n, door lock 180a (and associated Bluetooth antenna), personal computer 184a (and associated Bluetooth antenna), point-of-service terminal 188a (and associated Bluetooth antenna), and additional devices 190 (and associated Bluetooth antenna 190a).

Although the term "smartphone" may be used herein, smartphone 110 may encompass any number of different electronic user devices, such as mobile phones, smartphones, personal digital assistants (PDAs), portable computing devices (e.g., laptop, netbook, tablets), handheld computing device, or any other type of computing device capable of communicating over communication network 150. Smartphone 110 may also be configured to access data from other storage media, such as memory cards or disk drives as may be appropriate in the case of downloaded services. Smartphone 110 may include standard hardware computing components such as network and media interfaces, non-transitory computer-readable storage (memory), and processors for executing instructions that may be stored in memory.

Smartphone 110 may communicate wirelessly via communication network 150 via communication channel 150, which may further communicate with remote secure access lock 160 and remotely connected devices 164a-n via a communication channel 154. Further, smartphone 110 may also communicate via Bluetooth antenna 170 with various other devices within Bluetooth range and that also have Bluetooth antennas (e.g., door lock 180a, personal computer 184a, point-of-service terminal 188a, and additional devices 190).

In certain instances, smartphone 110 may receive a biometric input recognized by fingerprint recognition module 118 and send a signal via antenna 144 or Bluetooth antenna 170 to a selected device. Such device may be selected by the user from a menu displayed on a user interface of smartphone 110 generated after polling for available devices. The signal sent from smartphone 110 may include a code that locks (if unlocked) or unlocks (if locked) a lock associated with the selected remote electronic device. In other instances, the biometric data itself may be sent to the selected remote electronic device, which may then validate the biometric data and lock or unlock an associated lock. The lock may be a physical lock (e.g., a lock to a door of a building, department, floor, elevator, room/office, window) or an electronic lock on a computing device (e.g., point of sale terminal, computer, computing application, or other computing resource on a computer network).

Home button 114 is a button that may be programmed to activate or deactivate smartphone 110 or applications 120 thereon. In some instances, home button 114 may also include an integral fingerprint scanner. An example of such a home button combined with a fingerprint scanner is the home button/fingerprint scanner in an Apple iPhone 5S.

Fingerprint recognition 118 may be any program that operates an automated method of verifying a match between received biometric input and stored biometric input (e.g., fingerprints) to verify user identity. For example, a received fingerprint scan may be compared to a stored scan to see if the two scans match.

Applications 120 are software programs like those designed to run on smartphones, tablet computers, and other mobile devices. These software program applications 120 provide functions that include, yet are not limited to email, calendar scheduling, managing contact lists, performing stock market trades, checking the weather report, game playing, global positioning system services (GPS), location-based services, banking, online purchases, point of sale purchases, and order tracking. Such applications 120 may be native (e.g., provided by operating system developer) or may be downloaded from an application store.

Operating system (OS) 130 may be a collection of software that manages computer hardware resources and provides common services for computer programs, including applications 120. The operating system 130 is an essential component of the system software in a computer system. Applications 120 are usually developed for a specific operation system 130 and therefore rely on the associated operating system 130 to perform its functions. For hardware functions such as input and output and memory allocation, the operating system 130 acts as an intermediary between applications 120 and the computer hardware. Although application code is usually executed directly by the hardware, applications 120 may frequently make a system call to an OS function or be interrupted by it. Operating systems 130 can be found on almost any device with computing or processing ability. Examples of popular modern operating systems include Android, BSD, iOS, Linux, OS X, QNX, Microsoft Windows, Windows Phone, and IBM z/OS. Most of these (except Windows, Windows Phone and z/OS) may share roots in UNIX.

Operating system settings 140 may be a software function that opens a display that lists OS functions that may be generated upon selection of a user interface button. Such a list of OS functions may be associated with various options that allow the user to designate certain preferences or settings 140 with respect to how certain operating system functions are performed (e.g., display preferences, wireless network preferences, information sharing, accessibility of applications to system information, such as GPS/location, notifications). Once these settings 140 are set, the operating system 130 uses the settings 140 to perform various functions, which includes functions related to execution of an application 120.

Device antenna 144 may be an antenna that allows smartphone 110 to communicate wirelessly over the communication network 150 via communication channels (e.g., communication channels 148 and 154). Such antenna 144 may communicate over WiFi, 4G/3G, Bluetooth, and/or any other known radio frequency communication network known in the art.

Communication network 150 may be a local, proprietary network (e.g., an intranet) and/or may be a part of a larger wide-area network. Communication network 150 may comprise a variety of connected computers that may provide a set of network-based services. Such network service may be provided by real server hardware and/or by virtual hardware as simulated by software running on one or more real machines. Such virtual servers may not physically exist and can therefore be moved around and scaled up (or down) on the fly without affecting end-users (e.g., like a cloud).

Communication network 150 allow for communication between smartphone 110 and other devices via various communication paths or channels 148 and 154. Such paths or channels 148 and 154 may include any type of data communication link known in the art, including TCP/IP connections and Internet connections via Wi-Fi, Bluetooth, UMTS, etc. In that regard, communications network 130 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. In certain instances, the Internet provides various forms of network-based services that may appear to be provided by real server hardware, yet are sometimes provided using a virtual server. A virtual server may be comprised of software controlling available hardware resources. In certain instances, such software makes the available hardware resources appear as a single server, when it is not. The function of a virtual server may be performed by a plurality of networked computers and may be referred to as a cloud.

Remote secure access lock 160 may be an electronic locking system that restricts access to files, devices, and other resources that are not directly connected to smartphone 110. For example, a remote secure access lock 160 may be a firewall device or software program residing on a computer. Remotely connected devices 164*a-n* may be devices accessed remotely through the cloud (e.g., communication network 150). Examples of remotely connected devices 164*a-n* may include an electronic car starter that starts a car when a signal is received, locks/unlocks the car door locks, and a lock that controls access to an account on a website.

Bluetooth antenna 170 may allow smartphone 110 to exchange data with other electronic devices over short distances. In certain instances, a Bluetooth network is configured as a personal area network (PAN) with a high level of security. Bluetooth antenna 170 may transmit and receive standard Bluetooth signals via Bluetooth channels 174*a-d* to any of the remote devices 180*a*, 184*a*, 188*a*, 190/*a*. While such devices are illustrated as communicating via Bluetooth, many may further be capable of communicating via communication network 150 as well.

Door lock 180a may be a physical lock on a door that may be locked or unlocked remotely via a Bluetooth signal, thereby allowing the user to enter or secure a physical space. Personal computer 184a may be a personal computer with electronic security settings that may be locked/unlocked via biometric-related data sent via a Bluetooth signal from smartphone 110. Point of service terminal 188a may be a point of service terminal that may be accessed remotely. In certain instances, point of service terminal 188 may be an electronic cash register at a retail establishment or a vending machine. Additional devices 190 may be any electronic device known in the art that may be accessed remotely.

In operation, a user of smartphone 110 may select settings 140 to enable and customize pass-through security options. In other instances, a user may use application 120 to enable pass-through security. For example, the user may enable fingerprint recognition for pass-through security on designated devices. Once a fingerprint scan is received (e.g., home button 114) and validated (e.g., fingerprint recognition module 118), the user may be allowed to select from a menu of locking/unlocking options, as well as a menu of available devices upon which the locking or unlocking action can be performed. A code indicative of the selected lock or unlock action may be generated and sent to a selected electronic device, which may then perform the indicated lock or unlock action.

Figure 2:
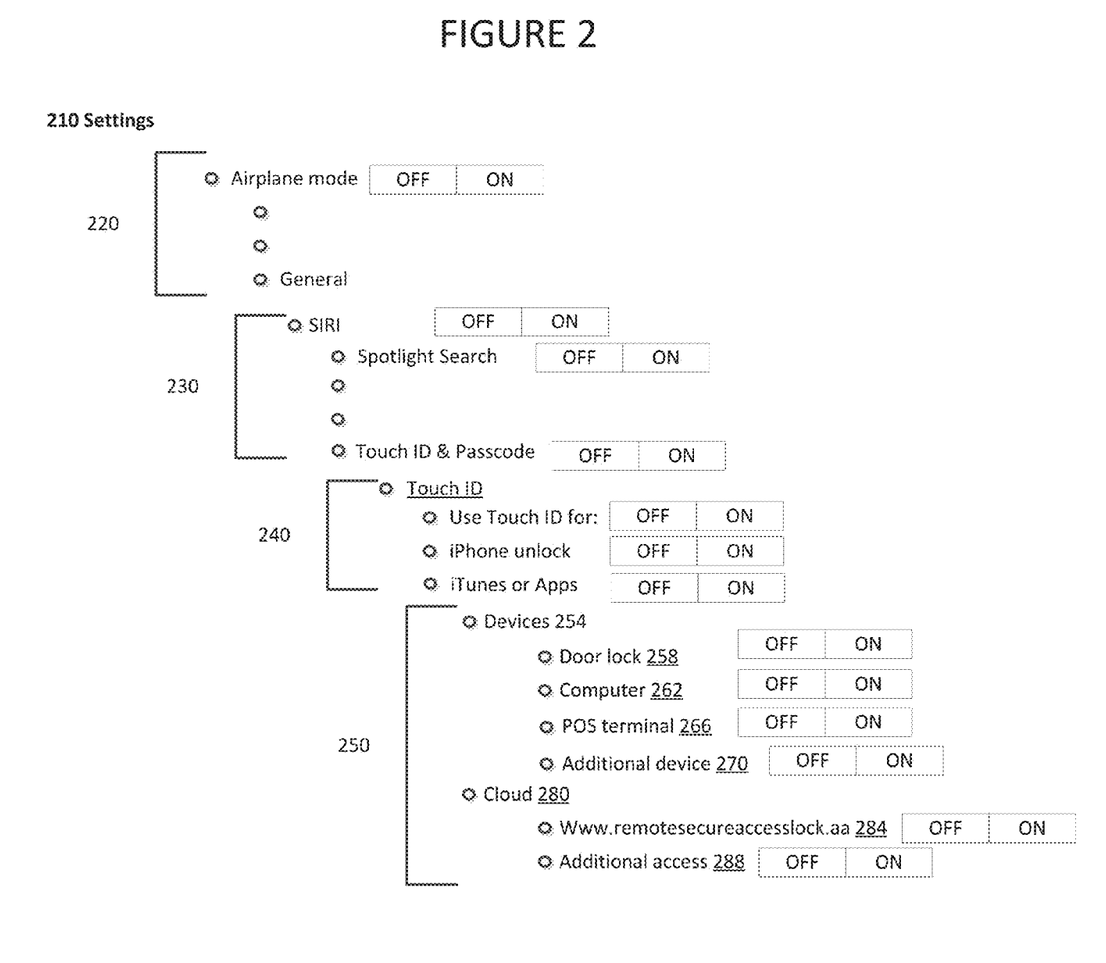

FIG. 2 illustrates exemplary operating system settings 210 that may be used in a system for smartphone fingerprint pass-through. Such settings 210 may include standard settings 220, which may include such options to enable or disable airplane mode and general settings 230.

General settings 230 may include various options to enable or disable such functionalities related to a virtual assistant (e.g., SIRI on the iPhone), search tools (e.g., Spotlight Search), and security (e.g., Touch ID, Passcode). Touch ID settings 240 may allow the user to specify whether to enable security measure based on fingerprint recognition, as well as allow for unlocking of the phone and of certain applications (e.g., applications with in-app purchases) based on fingerprint recognition.

One particular sub-option related to Touch ID may include pass-through settings 250. Pass-through settings 250 may be used to select which devices are allowed to be locked/unlocked based on biometric input received at the smartphone. As illustrated, such devices may selected from a menu listing door lock 258, computer 262, POS terminal 266, additional devices 270, and cloud devices 280. Cloud devices 280 may be further identified via a link 284 (e.g., www.remotesecureaccesslock.aa) and other devices to be added 288. Cloud devices 280 may generally correspond to devices 164a-n, and link 284 may allow for sending authentication data to the identified website that controls remote access to devices 164a-n.

Figure 3:
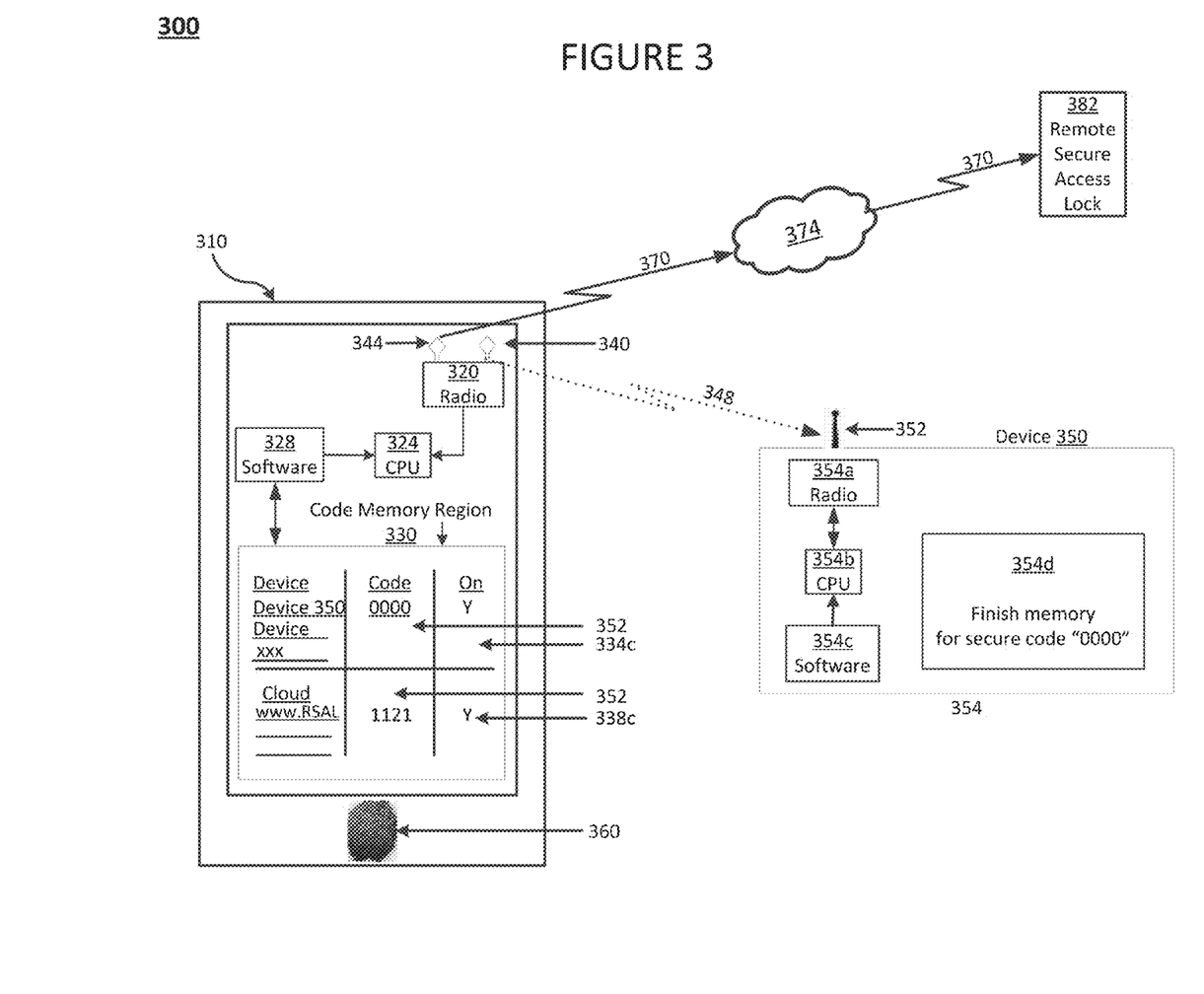

FIG. 3 illustrates an exemplary system 300 for smartphone fingerprint pass-through. System 300 may include smartphone 310, remote device 350, and remote secure access lock 382. Such devices may communicate wirelessly via communication channels 370 over cloud communication network 374 or via Bluetooth channel 348.

Smartphone 310 may include radio 320, CPU 324, software 328, code memory region 330 (including fields for on/off status 334c and 338c, code 352, and device name 350), and fingerprint scanner 360. Radio 320 may include Bluetooth antenna 340 and antenna 344.

Radio 320 may be any wireless transceiver known in the art for communicating electromagnetic signals within a radio band of the electromagnetic spectrum. CPU 324 may be any central processing unit, microprocessor, or programmable gate array performing the functions of a microprocessor or another form of a computer processor known in the art. Software 328 may be any software program on smartphone 310.

Code memory region 330 may be any type of internal storage known in the art for storing data, instructions operable by the CPU 324, or may further include data related to a software application. Code memory region 330 may be embodied on any type of electronic non-volatile computer storage medium, including non-volatile memory that is electronically erasable and reprogrammable. Code memory region 330 may include data fields for storing information regarding a variety of devices. Such information may include on/off status 334c and 338c, code 352, and device name 350.

On/off status 334c and 338c may reflect whether a particular device is on or off. As the respective device switched on/off (or locked/unlocked), the on/off status 334c and 338c may be updated accordingly. Code 352 may be any secret word, character string, or set of data used to switch an associated device on/off (or locked/unlocked). In certain instances, code 352 may comprise authentication information for a user, user identity information, user biometric information, etc. Device name 350 may be any name or identifier used to identify a particular device.

Fingerprint 360 in smartphone 310 may be any fingerprint scanner, which may be associated with a fingerprint recognition module that stores previous fingerprint scans and compares received fingerprint scans with the stored scans. Fingerprint 360 may store a collection of impressions left by the friction ridges on any finger of a person. In certain instances, fingerprint 360 may verify a match between two human fingerprints that enables individuals to be identified.

Bluetooth antenna 340 may be any communicating device that allows the smartphone to exchange data with other electronic devices using a Bluetooth connection 348. Bluetooth connection 348 allows for wireless transmission between a pair of devices. For example, Bluetooth connection 348 may communicate data between smartphone 310 and device 350 using a secure Bluetooth connection. In certain instances, a Bluetooth network is used to create a personal area network (PANs) that transmits secure data over short distances.

The antenna 344 may be any device used to create a data link between the smartphone 110 and a communication network 374 (e.g., 3G mobile network, a 4G mobile network, or a WiFi network).

Device 350 may be any type of device that may communicate wirelessly with smartphone 310. Device 350 may include Bluetooth antenna 352, radio 354a, CPU 354b, Software 354c, and memory 354d. Bluetooth antenna 352, radio 354a, CPU 354b, Software 354c, and memory 354d may correspond respectively with Bluetooth antenna 340, CPU 324, software 328, and memory 330 in smartphone 310.

Upon receiving a fingerprint from a user who indicates a desire to unlock device 350, smartphone 310 may receive a fingerprint via fingerprint scanner 360, validate a received fingerprint by executing an associated fingerprint recognition module using CPU 324, retrieve the code associated with device 350 (e.g., code 0000) from code memory region 330, and send the retrieved code to device 350. Upon receiving such code, device 350 may verify against the code stored in memory 354d and perform the requested unlock.

A similar operation may occur over cloud communication network 374 with remote secure access lock 382. Remote secure access lock 382 may be a mechanism that restricts access to files, devices, or other computer resources (e.g., devices 164a-n of FIG. 1) that may be accessed through the cloud communication network 374.

Figure 4:
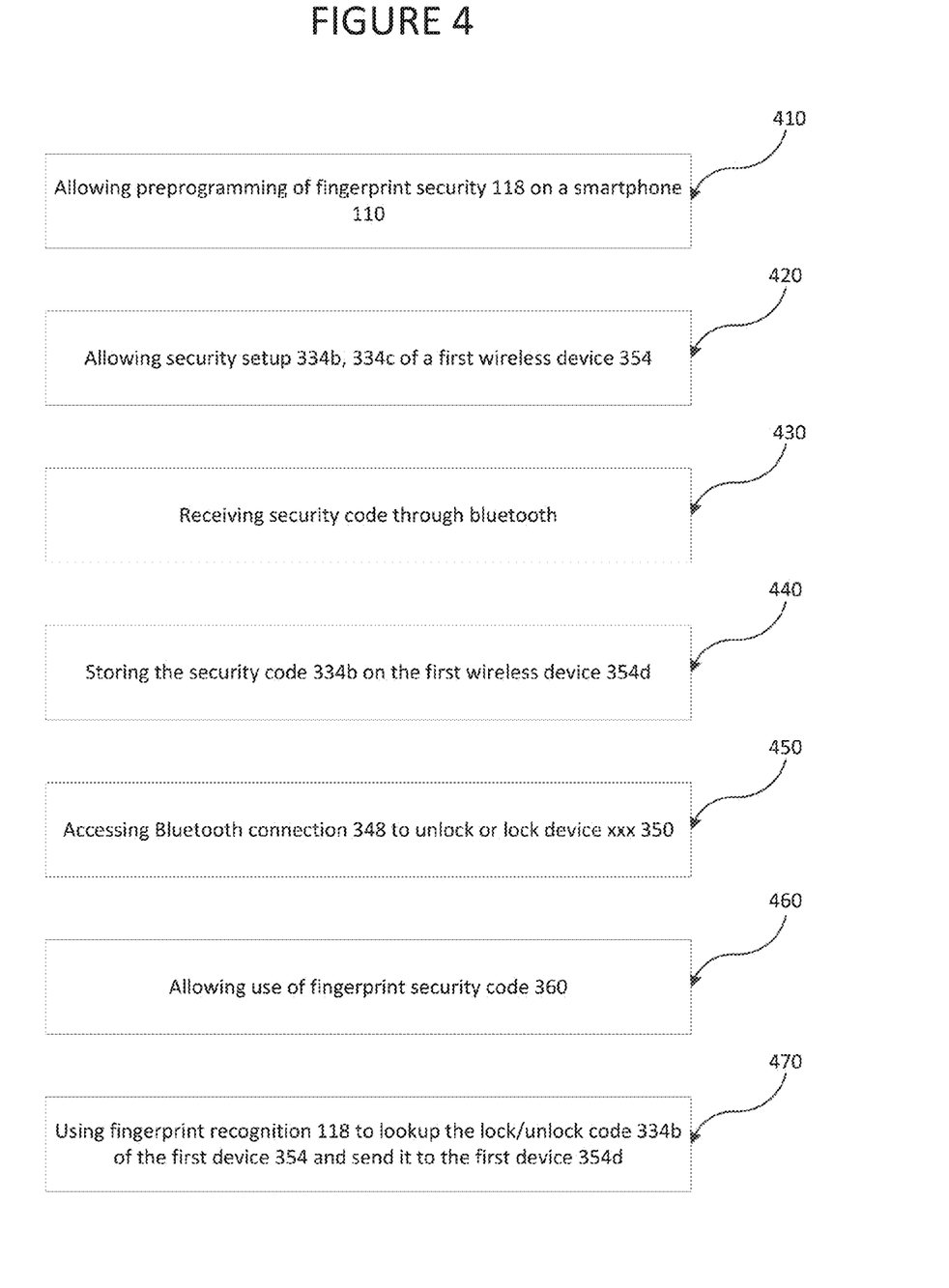

FIG. 4 is a flowchart illustrating an exemplary method for smartphone fingerprint pass-through. In step 410, the biometric security on a smartphone 110 may be initialized. This step involves preprogramming fingerprint security 118 into a smartphone 110 by adding a user's fingerprints to the smartphone's authentication and verification system.

In step 420, biometric security may be initialized on smartphone 110. Here, a user associates their fingerprint with a security code that will lock or unlock a remote lock controlled by a remote electronic device. For example, a user associates a fingerprint with device 350 and with security code 334b. The user may then associate a different fingerprint with a remote secure access lock 382 and with code 338b. After initializing a biometric security function, a specific fingerprint will correspond to a specific code.

In step 430, the security code may be received. Such a security code may be sent via Bluetooth or other wireless connection, and may further be associated with turning device 350 on or off. In step 440, the security code may be stored. In certain instances, such storage may include persistently storing security code 334b on smartphone 310. In other instances, this step may also include smartphone initializing the flash memory secure code 354d on device 350.

In step 450, Bluetooth connection 348 may transmit the code to lock or unlock a lock associated with a remote electronic device. For example, a user may open a sub-menu that identifies that device 350 may be unlocked with a biometric input.

Step 460 may include allowing use of a fingerprint to retrieve or be associated with a security code 360. As such, when smartphone 310 receives a biometric input from a user, the user's identity will be verified against a biometric input that stored previously on smartphone 310.

In step 470, fingerprint recognition 360 may lock or unlock device 350 using fingerprint recognition 360 built into smartphone 310. After the user's biometric input is verified, security code 334b that is associated with device 350 may be identified. Security code 334b may then be transmitted to device 350. Once device 350 receives security code 334b, it may then compare the security code 334b with a locally stored code 354d in device 350. When the received code matches code 354d, device 350 unlocks the lock that is associated with device 350.

Figure 5:
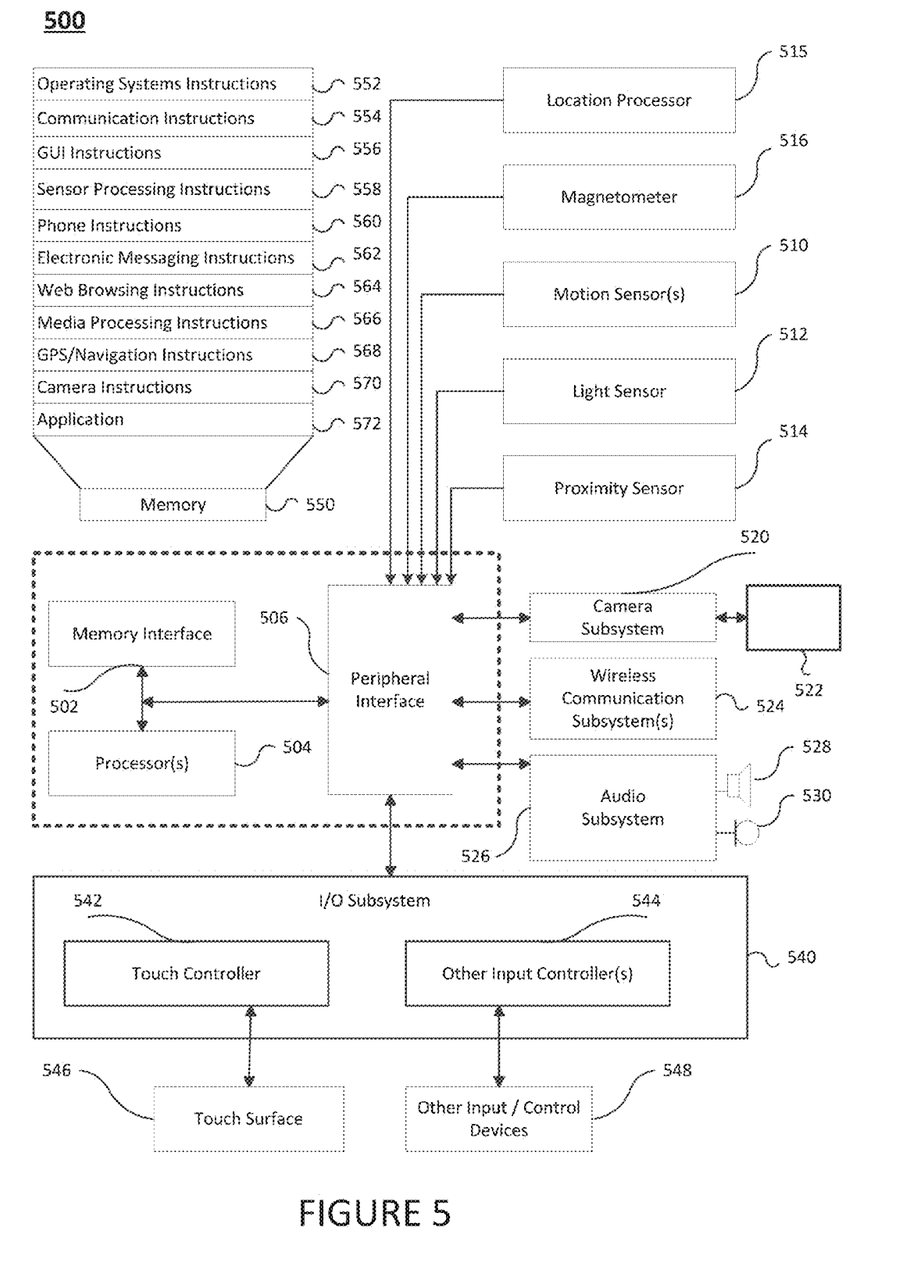

FIG. 5 illustrates a device architecture 500 of a user device that may be used in a system for smartphone fingerprint pass-through. Architecture 500 can be implemented in any number of portable devices including but not limited to smart phones, electronic tablets, and gaming devices. Architecture 500 may include memory interface 502, processors 504, and peripheral interface 506. Memory interface 502, processors 504 and peripherals interface 506 can be separate components or can be integrated as a part of one or more integrated circuits. The various components can be coupled by one or more communication buses or signal lines.

Processors 504 as illustrated in FIG. 5 are meant to be inclusive of data processors, image processors, central processing unit, or any variety of multi-core processing devices. Any variety of sensors, external devices, and external subsystems can be coupled to peripherals interface 506 to facilitate any number of functionalities within the architecture 500 of the exemplar mobile device. For example, motion sensor 510, light sensor 512, and proximity sensor 514 can be coupled to peripherals interface 506 to facilitate orientation, lighting, and proximity functions of the mobile device. For example, light sensor 512 could be utilized to facilitate adjusting the brightness of touch surface 546. Motion sensor 510, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 506, such as a temperature sensor, a biometric sensor, or other sensing device to facilitate corresponding functionalities. Location processor 515 (e.g., a global positioning transceiver) can be coupled to peripherals interface 506 to allow for generation of geo-location data thereby facilitating geo-positioning. An electronic magnetometer 516 such as an integrated circuit chip could in turn be connected to peripherals interface 506 to provide data related to the direction of true magnetic North whereby the mobile device could enjoy compass or directional functionality. Camera subsystem 520 and an optical sensor 522 such as a charged coupled device (CCD) or a complementary metal-oxide semiconductor (CMOS) optical sensor can facilitate camera functions such as recording photographs and video clips.

Communication functionality can be facilitated through one or more communication subsystems 524, which may include one or more wireless communication subsystems. Wireless communication subsystems 524 can include 802.5 or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 524 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.5 communication networks, code division multiple access (CDMA) networks, or Bluetooth networks. Communication subsystem 524 may include hosting protocols such that the device may be configured as a base station for other wireless devices. Communication subsystems can also allow the device to synchronize with a host device using one or more protocols such as TCP/IP, HTTP, or UDP.

Audio subsystem 526 can be coupled to a speaker 528 and one or more microphones 530 to facilitate voice-enabled functions. These functions might include voice recognition, voice replication, or digital recording. Audio subsystem 526 in conjunction may also encompass traditional telephony functions.

I/O subsystem 540 may include touch controller 542 and/or other input controller(s) 544. Touch controller 542 can be coupled to a touch surface 546. Touch surface 546 and touch controller 542 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 546 may likewise be utilized. In one implementation, touch surface 546 can display virtual or soft buttons and a virtual keyboard, which can be used as an input/output device by the user.

Other input controllers 544 can be coupled to other input/control devices 548 such as one or more buttons, rocker switches, thumb-wheels, infrared ports, USB ports, and/or a pointer device such as a stylus. The one or more buttons (not shown) can include an up/down button for volume control of speaker 528 and/or microphone 530. In some implementations, device 500 can include the functionality of an audio and/or video playback or recording device and may include a pin connector for tethering to other devices.

Memory interface 502 can be coupled to memory 550. Memory 550 can include high-speed random access memory or non-volatile memory such as magnetic disk storage devices, optical storage devices, or flash memory. Memory 550 can store operating system 552, such as Darwin, RT5C, LINUS, UNIS, OS 5, ANDROID, WINDOWS, or an embedded operating system such as V5Works. Operating system 552 may include instructions for handling basic system services and for performing hardware dependent tasks. In some implementations, operating system 552 can include a kernel.

Memory 550 may also store communication instructions 554 to facilitate communicating with other mobile computing devices or servers. Communication instructions 554 can also be used to select an operational mode or communication medium for use by the device based on a geographic location, which could be obtained by the GPS/Navigation instructions 568. Memory 550 may include graphical user interface instructions 556 to facilitate graphic user interface processing such as the generation of an interface; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes, camera instructions 570 to facilitate camera-related processes and functions; and instructions 572 for any other application that may be operating on or in conjunction with the mobile computing device. Memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The figures included with this disclosure are for the purpose of illustrating the invention. The figures show aspects of one or more embodiments of the invention and are examples, the figures are not meant to limit the scope of the invention. So it should be understood that the present invention is not limited to the precise arrangements and instrumentalities shown in the figures.

What is claimed is:

1. A method for remote security using biometric information, the method comprising:
   receiving a first fingerprint input associated with a first user via a fingerprint scanner interface of a mobile electronic device;
   storing a first fingerprint dataset characterizing the first fingerprint input in a memory of the mobile electronic device;
   storing a first security code in the memory, the first security code associated with the first fingerprint dataset;
   storing device information in the memory, the device information identifying a plurality of external electronic devices, the plurality of external electronic devices including an electronic vehicle starter device of a vehicle, the electronic vehicle starter device associated with the first security code;
   receiving a second fingerprint input via the fingerprint scanner interface of the mobile electronic device;
   executing instructions stored in the memory, wherein execution of the instructions by a processor causes the mobile electronic device to:
      identify that the second fingerprint input matches the first fingerprint dataset,
      validate that the second fingerprint input belongs to the first user based on identification that the second fingerprint input matches the first fingerprint dataset, retrieve the first security code of the plurality of security codes in response to identification that the second fingerprint input matches the first fingerprint dataset, and identify a remote electronic access device that restricts communicative access to the electronic vehicle starter device that is associated with the first security code; and transmitting the first security code from the mobile electronic device to the remote electronic access device via Internet transmission in response to identification that the second fingerprint input matches the first fingerprint dataset, wherein the remote electronic access device thereby remotely signals the electronic vehicle starter device via Internet transmission to start the vehicle, wherein the electronic vehicle starter device starts the vehicle upon being remotely signaled by the remote electronic access device.

2. The method of claim 1, further comprising receiving a selection identifying the vehicle via a user interface of the mobile electronic device.

3. The method of claim 1, further comprising receiving a biometric input at the mobile electronic device, wherein the biometric input includes at least one of a third fingerprint input, a voiceprint input, a retina scan input, or a DNA sample input.

4. The method of claim 1, wherein the remote electronic access device remotely signals the electronic vehicle starter device by sending at least a subset of the first security code.

5. The method of claim 1, wherein the electronic vehicle starter device also toggles a lock state of one or more doors of the vehicle.

6. The method of claim 1, wherein the vehicle is a car.

7. The method of claim 1, wherein the first security code includes at least a subset of the first fingerprint dataset.

8. A non-transitory computer readable storage medium in a mobile electronic device, the storage medium having embodied thereon a program executable by a processor to perform a method for remote security using biometric information, the method comprising:

receiving a first fingerprint input associated with a first user via a fingerprint scanner interface of a mobile electronic device;

storing a first fingerprint dataset characterizing the first fingerprint input in a memory of the mobile electronic device;

storing a first security code in the memory, the first security code associated with the first fingerprint dataset;

storing device information in the memory, the device information identifying a plurality of external electronic devices, the plurality of external electronic devices including an electronic vehicle starter device of a vehicle, the electronic vehicle starter device associated with the first security code;

receiving a second fingerprint input via the fingerprint scanner interface of the mobile electronic device;

identifying that the second fingerprint input matches the first fingerprint dataset;

validating that the second fingerprint input belongs to the first user based on identification that the second fingerprint input matches the first fingerprint dataset;

retrieving the first security code of the plurality of security codes in response to identification that the second fingerprint input matches the first fingerprint dataset;

identifying a remote electronic access device that restricts communicative access to the electronic vehicle starter device that is associated with the first security code; and transmitting the first security code from the mobile electronic device to the remote electronic access device via Internet transmission in response to identification that the second fingerprint input matches the first fingerprint dataset, wherein the remote electronic access device thereby remotely signals the electronic vehicle starter device via Internet transmission to start the vehicle, wherein the electronic vehicle starter device starts the vehicle upon being remotely signaled by the remote electronic access device.

9. The non-transitory computer readable storage medium of claim 8, the program further executable to receive a selection identifying the vehicle via a user interface of the mobile electronic device.

10. The non-transitory computer readable storage medium of claim 8, the program further executable to receive a biometric input at the mobile electronic device, wherein the biometric input includes at least one of a third fingerprint input, a voiceprint input, a retina scan input, or a DNA sample input.

11. The non-transitory computer readable storage medium of claim 8, wherein the remote electronic access device remotely signals the electronic vehicle starter device by sending at least a subset of the first security code.

12. The non-transitory computer readable storage medium of claim 8, wherein the electronic vehicle starter device also toggles a lock state of one or more doors of the vehicle.

13. The non-transitory computer readable storage medium of claim 8, wherein the vehicle is a car.

14. The non-transitory computer readable storage medium of claim 8, wherein the first security code includes at least a subset of the first fingerprint dataset.

15. A system for remote security using biometric information, the system comprising:

a memory of a mobile electronic device that stores at least a first fingerprint dataset, a first security code, and device information, wherein the first fingerprint dataset is associated with a first user, wherein the first security code is associated with the first fingerprint dataset, and wherein the device information identifies a plurality of external electronic devices, the plurality of external electronic devices including an electronic vehicle starter device of a vehicle, the electronic vehicle starter device associated with the first security code;

a fingerprint scanner interface that receives a first fingerprint input associated with a first user, thereby generating the first fingerprint dataset, and that further receives a second fingerprint input;

a processor that executes instructions stored in the memory, wherein execution of the instructions by the processor causes the system to:

identify that the second fingerprint input matches the first fingerprint dataset, validate that the second fingerprint input belongs to the first user based on identification that the second fingerprint input matches the first fingerprint dataset, retrieve the first security code of the plurality of security codes in response to identification that the second fingerprint input matches the first fingerprint dataset, and identify a remote electronic access device that restricts communicative access to the electronic vehicle starter device that is associated with the first security code; and a communication interface that transmits the first security code to the remote electronic access device via Internet transmission in response to identification that the second fingerprint input matches the first fingerprint dataset, wherein the remote electronic access device thereby remotely signals the electronic vehicle starter device via Internet transmission to start the vehicle, wherein the electronic vehicle starter device starts the vehicle upon being remotely signaled by the remote electronic access device.

16. The system of claim 15, wherein execution of the instructions by the processor causes the system to receive a selection via a user interface of the mobile electronic device, the selection identifying the vehicle.

17. The system of claim 15, further comprising a biometric interface distinct from the fingerprint scanner, wherein the biometric interface receives a biometric input that includes at least one of a third fingerprint input, a voiceprint input, a retina scan input, or a DNA sample input.

18. The system of claim 15, wherein the remote electronic access device remotely signals the electronic vehicle starter device by sending at least a subset of the first security code.

19. The system of claim 15, wherein the electronic vehicle starter device also toggles a lock state of one or more doors of the vehicle.

20. The system of claim 15, wherein the vehicle is a car.

* * * * *